United States Patent
Imai et al.

(10) Patent No.: US 11,248,571 B2
(45) Date of Patent: Feb. 15, 2022

(54) FUEL INJECTION VALVE AND ENGINE SYSTEM

(71) Applicant: DENSO CORPORATION, Kariya (JP)

(72) Inventors: Keita Imai, Kariya (JP); Takanori Kito, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/221,611

(22) Filed: Apr. 2, 2021

(65) Prior Publication Data

US 2021/0222656 A1    Jul. 22, 2021

Related U.S. Application Data

(63) Continuation of application No. PCT/JP2019/034568, filed on Sep. 3, 2019.

(30) Foreign Application Priority Data

Oct. 5, 2018    (JP) .............................. JP2018-189966

(51) Int. Cl.
*F02M 61/08*    (2006.01)
*F02M 51/06*    (2006.01)
(Continued)

(52) U.S. Cl.
CPC ....... *F02M 51/0614* (2013.01); *F02D 41/402* (2013.01); *F02M 51/0625* (2013.01); *F02M 61/10* (2013.01)

(58) Field of Classification Search
CPC .......... F02M 51/0614; F02M 51/0625; F02M 51/06; F02M 51/00; F02M 61/10; F02D 41/402
(Continued)

(56) References Cited

U.S. PATENT DOCUMENTS 9,322,374 B2    4/2016    Petrecchia et al.
10,502,170 B2*   12/2019    Thibault ............ F02M 61/1873
(Continued)

FOREIGN PATENT DOCUMENTS

DE    10 2014 215991    2/2016
DE    10 2016 215798    3/2018
(Continued)

*Primary Examiner* — Hai H Huynh
(74) *Attorney, Agent, or Firm* — Nixon & Vanderhye P.C.

(57) ABSTRACT

A fuel injection valve includes: a movable arrangement that is coupled to a movable core and a needle while a movable flow passage, which forms a part of a flow passage of the fuel injection valve, is formed at an inside of the movable arrangement; and a valve main body that receives the movable arrangement. The movable arrangement has: a first flow-restricting portion that reduces a cross-sectional area of a portion of the movable flow passage; and a second flow-restricting portion that is spaced away from the first flow-restricting portion and reduces a cross-sectional area of another portion of the movable flow passage to a cross-sectional area that is equal to or larger than a cross-sectional area of the first flow-restricting portion. A distance between the first flow-restricting portion and the second flow-restricting portion is larger than an equivalent diameter of the cross-sectional area of the second flow-restricting portion.

10 Claims, 13 Drawing Sheets

(51) Int. Cl.
*F02D 41/40* (2006.01)
*F02M 61/10* (2006.01)

(58) Field of Classification Search
USPC .................. 123/472, 490; 239/533.12, 585.1
See application file for complete search history.

(56) References Cited

U.S. PATENT DOCUMENTS

| | | | |
|---|---|---|---|
| 2012/0181355 A1* | 7/2012 | Corry | F23R 3/28 |
| | | | 239/436 |
| 2013/0037631 A1 | 2/2013 | Rogler | |
| 2016/0293311 A1 | 10/2016 | Cerny et al. | |
| 2017/0114765 A1 | 4/2017 | Dylong et al. | |
| 2017/0218902 A1 | 8/2017 | Del Frate et al. | |
| 2019/0331076 A1 | 10/2019 | Saizen et al. | |

FOREIGN PATENT DOCUMENTS

| | | |
|---|---|---|
| JP | 2015-200183 | 11/2015 |
| JP | 2016-048066 | 4/2016 |
| JP | 2017-210964 | 11/2017 |

* cited by examiner

FIRST EMBODIMENT

FUEL INJECTION VALVE AND ENGINE SYSTEM

CROSS REFERENCE TO RELATED APPLICATIONS

This application is a continuation application of International Patent Application No. PCT/JP2019/034568 filed on Sep. 3, 2019, which designated the U.S. and claims the benefit of priority from Japanese Patent Application No. 2018-189966 filed on Oct. 5, 2018. The entire disclosures of all of the above applications are incorporated herein by reference.

TECHNICAL FIELD

The present disclosure relates to a fuel injection valve and an engine system.

BACKGROUND

There has been proposed an injector (fuel injection valve) that includes: a flow passage extending along a longitudinal axis; a needle having a valve function for opening and closing the flow passage; an armature for driving the needle; and a damping element for reducing a speed of the needle. The flow passage is opened and closed by driving the needle. At this time, the speed of the needle is damped by the damping element.

SUMMARY

This section provides a general summary of the disclosure, and is not a comprehensive disclosure of its full scope or all of its features.

According to one aspect of the present disclosure, there is provided a fuel injection valve including an injection hole for injecting fuel and a flow passage for conducting the fuel to the injection hole. The fuel injection valve includes: a coil that is configured to generate a magnetic flux when the coil is energized; a stationary core that is configured to form a passage of the magnetic flux and generate a magnetic force; a movable arrangement that is coupled to a movable core configured to be moved by the magnetic force and a needle configured to be driven by the movable core to open and close the injection hole, wherein a movable flow passage, which forms a part of the flow passage, is formed at an inside of the movable arrangement; and a valve main body that receives the movable arrangement in a movable state where the movable arrangement is movable along an axis of the fuel injection valve while the valve main body forms another part of the flow passage at an inside of the valve main body. The movable arrangement has a plurality of flow-restricting portions.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
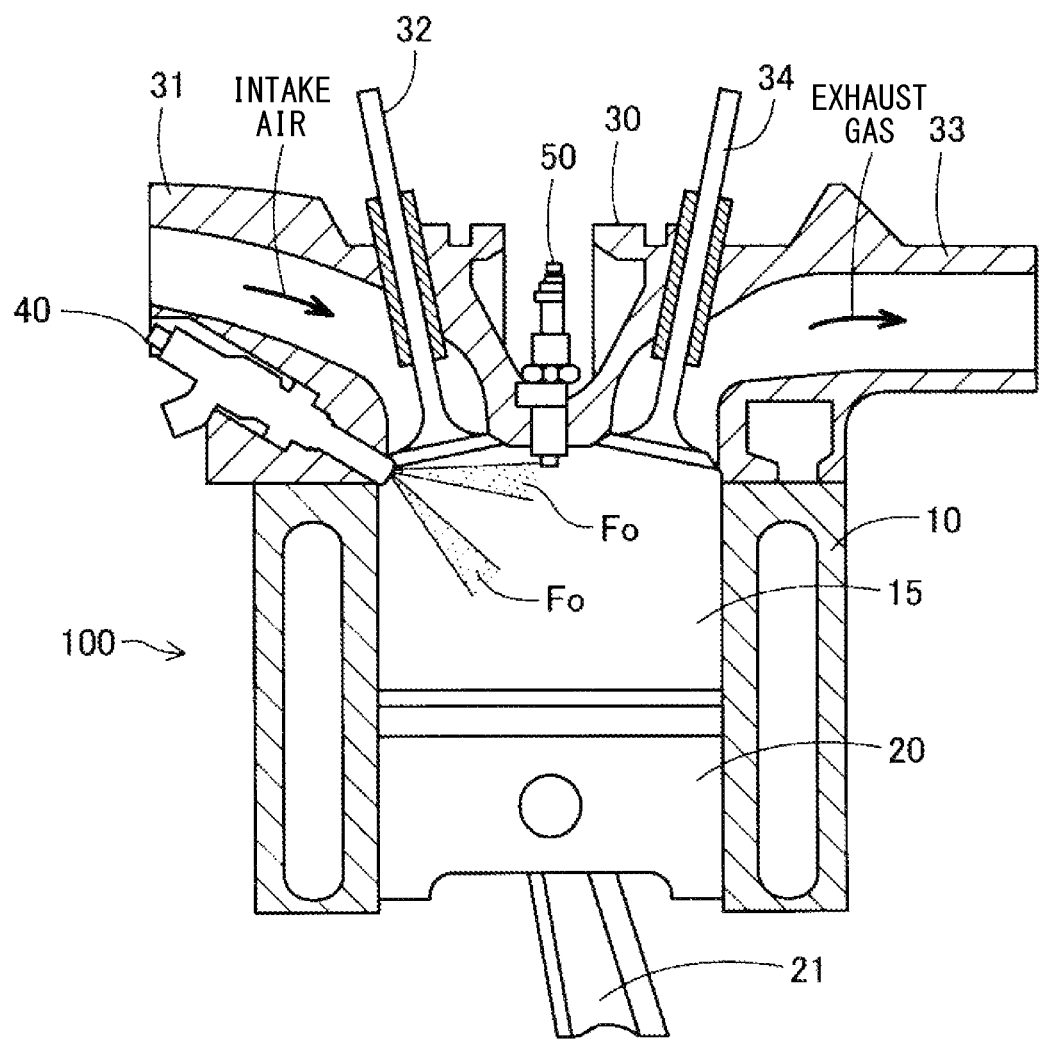
FIG. 1 is an explanatory view showing a schematic configuration of an engine system.

There has been proposed an injector (fuel injection valve) that includes: a flow passage extending along a longitudinal axis; a needle having a valve function for opening and closing the flow passage; an armature for driving the needle; and a damping element for reducing a speed of the needle. The flow passage is opened and closed by driving the needle. At this time, the speed of the needle is damped by the damping element.

When the pressure of the injector increases, a collision speed of a distal end of the needle (serving as a valve element) at a time of colliding against a valve seat at a valve closing time is increased. As a result, rebound of the needle and wearing of a contact portion may occur. In order to avoid these, it is conceivable to provide a flow-restricting portion in the flow passage. However, if the flow passage is simply provided with the flow-restricting portion, there is a disadvantage that the valve can be easily opened by a water-hammer action at the valve-closing time, that is, the valve can be easily opened by a pressure wave that is generated by the valve closing operation and is moved in a valve opening direction.

According to one aspect of the present disclosure, there is provided a fuel injection valve including an injection hole for injecting fuel and a flow passage for conducting the fuel to the injection hole. The fuel injection valve includes: a coil that is configured to generate a magnetic flux when the coil is energized; a stationary core that is configured to form a passage of the magnetic flux and generate a magnetic force; a movable arrangement that is coupled to a movable core configured to be moved by the magnetic force and a needle configured to be driven by the movable core to open and close the injection hole, wherein a movable flow passage, which forms a part of the flow passage, is formed at an inside of the movable arrangement; and a valve main body that receives the movable arrangement in a movable state where the movable arrangement is movable along an axis of the fuel injection valve while the valve main body forms another part of the flow passage at an inside of the valve main body, wherein: the movable arrangement has a plurality of flow-restricting portions that include: a first flow-restricting portion that reduces a cross-sectional area of a portion of the movable flow passage; and a second flow-restricting portion that is spaced away from the first flow-restricting portion and reduces a cross-sectional area of another portion of the movable flow passage to a cross-sectional area that is equal to or larger than a cross-sectional area of the first flow-restricting portion; and a distance between the first flow-restricting portion and the second flow-restricting portion is larger than an equivalent diameter of the cross-sectional area of the second flow-restricting portion. According to this aspect, the time, at which the pressure wave generated by the water-hammer action at the valve closing time reaches the second flow-restricting portion, differs from the time, at which the pressure wave generated by the water-hammer action at the valve closing time reaches the first flow-restricting portion. Accordingly, a valve opening force, which is generated by the pressure wave applied to each of the flow-restricting portions, can be dispersed relative to the time axis. Therefore, the valve opening of the needle by the pressure wave generated by the water-hammer action at the valve closing time can be limited. According to this aspect, the time, at which the pressure wave generated by the water-hammer action at the valve closing time reaches the second flow-restricting portion, differs from the time, at which the pressure wave generated by the water-hammer action at the valve closing time reaches the first flow-restricting portion. Accordingly, a valve opening force, which is generated by the pressure wave applied to each of the flow-restricting portions, can be dispersed relative to the time axis. Therefore, the valve opening of the needle by the pressure wave generated by the water-hammer action at the valve closing time can be limited.

Now, embodiments of the present disclosure will be described with reference to the drawings.

First Embodiment

An engine 100, in which a fuel injection valve 40 is used, will be described with reference to FIG. 1. The engine 100 includes a cylinder block 10, a piston 20, a cylinder head 30, a fuel injection valve 40 and a spark plug 50. The cylinder block 10 is a member made of a metal, such as cast iron, aluminum, or an aluminum alloy, and has a cylindrical inner wall. The piston 20 is installed such that the piston 20 reciprocates in the cylinder block 10. The piston 20 is connected to a crankshaft (not shown) by a connecting rod 21. With this configuration, the reciprocating motion of the piston 20 is converted into a rotary motion. The cylinder head 30 is made of a metal, such as cast iron, aluminum, or an aluminum alloy. The cylinder head 30 closes an open end of the cylinder block 10. A combustion chamber 15, which is a chamber for burning fuel, is surrounded by an inner wall of the cylinder block 10, the cylinder head 30, and the piston 20.

The cylinder head 30 includes an intake manifold 31 and an exhaust manifold 33. The intake manifold 31 is a flow passage for supplying air to the combustion chamber 15, and an intake valve 32 is provided between the intake manifold 31 and the combustion chamber 15. The exhaust manifold 33 is a flow passage for discharging exhaust gas generated by combustion of the fuel in the combustion chamber 15, and an exhaust valve 34 is provided between the exhaust manifold 33 and the combustion chamber 15.

The fuel injection valve 40 is located on a side of the cylinder block 10 where the intake manifold 31 is placed. The fuel injection valve 40 directly injects a fuel spray Fo into the combustion chamber 15 at a predetermined timing. The spark plug 50 is arranged between the intake valve 32 and the exhaust valve 34 at the cylinder head 30 and is configured to ignite the fuel in the combustion chamber 15.

The engine 100 is a four-stroke engine that sequentially executes four strokes, i.e., an intake stroke, a compression stroke, an expansion stroke, and an exhaust stroke, as strokes of a combustion cycle. Following the exhaust stroke, the intake stroke is executed, and the four strokes are repeatedly executed.

The intake stroke is a stroke in which the intake valve 32 is opened, and the exhaust valve 34 is closed, and the piston 20 is lowered by rotation of the crankshaft to take air into the combustion chamber 15.

The compression stroke is a stroke in which the intake valve 32 and the exhaust valve 34 are closed, and the piston 20 is pushed up by the rotation of the crankshaft to compress the air in the combustion chamber 15.

The expansion stroke is a stroke in which the intake valve 32 and the exhaust valve 34 are closed, and the fuel in the combustion chamber 15 is ignited by the spark plug 50 so that a volume of the gas in the combustion chamber 15 is expanded to push down the piston 20 by the volume expansion. As a result, the crankshaft is rotated through the connecting rod 21.

The exhaust stroke is a stroke in which the intake valve 32 is closed, and the exhaust valve 34 is opened, and the piston 20 is pushed up by the rotation of the crankshaft to discharge the exhaust gas from the combustion chamber 15.

The engine 100 for a vehicle is generally a multi-cylinder engine. In the case of the multi-cylinder engine, the strokes of each cylinder are executed with a time lag. In the present embodiment, the fuel is injected from the fuel injection valve 40 into the combustion chamber 15 in the intake stroke. The fuel may be injected from the fuel injection valve 40 into the combustion chamber 15 in the compression stroke. The fuel may be injected from the fuel injection valve 40 into the combustion chamber in both the intake stroke and the compression stroke. Further, in the compression stroke, the fuel may be injected from the fuel injection valve 40 into the combustion chamber 15 twice or more. As described above, the fuel may be injected from the fuel injection valve 40 into the combustion chamber 15 twice or more per the combustion cycle.

Figure 2:
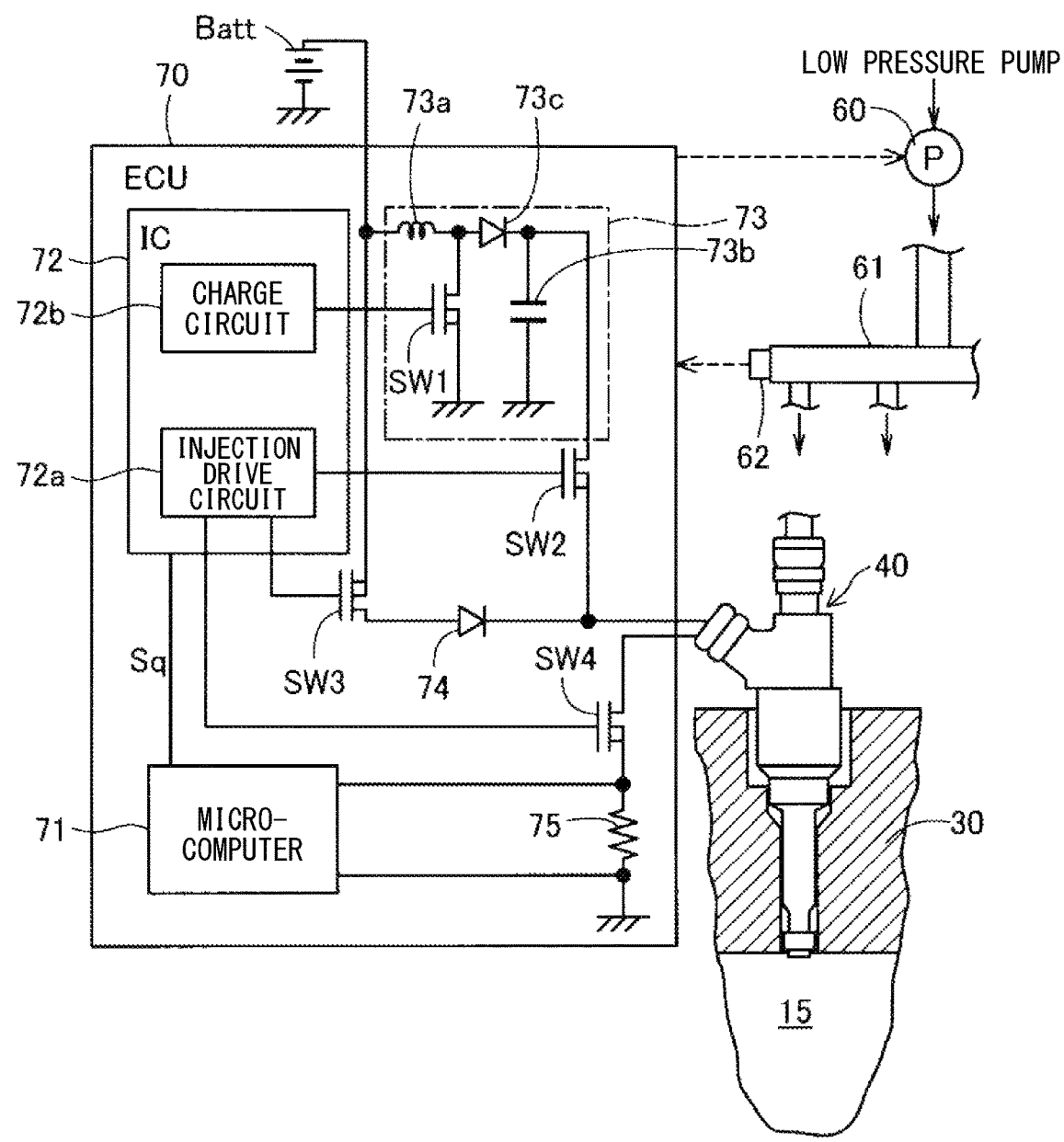
FIG. 2 is an explanatory diagram showing a control system for a fuel injection valve.

FIG. 2 is an explanatory diagram showing an example of the fuel injection valve 40 and a controller 70 thereof. The fuel to be supplied to the fuel injection valve 40 is stored in a fuel tank (not shown). A low-pressure pump pumps up fuel in the fuel tank. Then, a high-pressure pump 60 further pressurizes the fuel supplied from the low-pressure pump and pumps it to a delivery pipe 61. At this time, the pressure of the high-pressure pump 60 is several tens to 100 MPa. A fuel pressure sensor 62, which senses a pressure applied to the fuel, is connected to the delivery pipe 61. The high-pressure fuel in the delivery pipe 61 is distributed and supplied to the fuel injection valve 40 of each cylinder.

The controller 70 (abbreviated as ECU 70) includes a microcomputer 71, a driver IC 72, a booster circuit 73, and switching elements SW2, SW3, SW4.

The microcomputer 71 includes a central processing unit, a non-volatile memory (ROM), and a volatile memory (RAM). The microcomputer 71 computes a required fuel injection amount Qreq and a target injection start timing Tca based on a load and an engine rotational speed of the engine 100. A characteristic line showing a relationship between an energization time Ti and an injection amount Q is obtained through testing in advance. Then, the energization time Ti of the fuel injection valve 40 is controlled according to the characteristic line to adjust the injection amount Q to the required fuel injection amount Qreq.

The driver IC 72 includes an injection drive circuit 72a for controlling the operation of the switching elements SW2, SW3, SW4, and a charge circuit 72b for controlling the booster circuit 73. These circuits 72a, 72b operate based on an injection command signal Sq outputted from the microcomputer 71. The injection command signal Sq is a signal for commanding the energization state of the fuel injection valve 40. The microcomputer 71 sets the injection command signal Sq based on the required injection amount Qreq and the target injection start timing Tca described above and a coil current measurement value I described later.

The booster circuit 73 includes a coil 73a, a capacitor 73b, a diode 73c, and a switching element SW1. When the charge circuit 72b controls the switching element SW1 such that the switching element SW1 repeats on and off operations, the battery voltage applied from the battery Batt is boosted by the coil 73a is stored in the capacitor 73b. Specifically, when the switching element SW1 is turned on, an electric current flows from the battery Batt through the coil 73a, and electrical energy is stored in the coil 73a. Thereafter, when the switching element SW1 is turned off, the electrical energy stored in the coil 73a flows to the capacitor 73b through the diode 73c and charges the capacitor 73b. By repeating the turning on and off of the switching element SW1, the voltage of the capacitor 73b is increased. This increased voltage is referred to as a boost voltage.

Then, when the injection drive circuit 72a turns on both the switching elements SW2, SW4, the boost voltage is applied to the fuel injection valve 40. In contrast, when the injection drive circuit 72a turns off the switching element SW2 and turns on the switching element SW3, the battery voltage is applied to the fuel injection valve 40. The switching elements SW2, SW3, SW4 are turned off when the application of the voltage to the fuel injection valve 40 is stopped. The diode 74 is for preventing the boost voltage from being applied to the switching element SW3 when the switching element SW2 is turned on.

The shunt resistor 75 is for sensing the electric current flowing through the switching element SW4, i.e., the electric current (coil current) flowing through the fuel injection valve 40. The microcomputer 71 senses the magnitude of the coil current described above (coil current value) I based on a potential difference generated by the shunt resistor 75.

In the present embodiment, during the valve-opening period of the fuel injection valve 40 in which the switching element SW4 is turned on, the switching element SW2 is turned on so that the boost voltage is applied to the fuel injection valve 40, and thereby the fuel injection valve 40 is opened (i.e., valve opening of the fuel injection valve 40 is executed). Subsequently, the switching element SW3 is turned on to apply the battery voltage to the fuel injection valve 40 so that the fuel injection valve 40 is maintained in the valve-opening state. Then, the switching elements SW2, SW3, SWS4 are turned off to terminate the application of the voltage to the fuel injection valve 40 so that the fuel injection valve 40 is placed in the valve-closing state. In the following description, for convenience of understanding, it is assumed that the fuel injection valve will be opened by applying the voltage from the booster circuit 73, and the fuel injection valve 40 will be closed by ending the application of the voltage. In the present embodiment, there are provided two circuits, i.e., the circuit for applying a pulse voltage of the boost voltage by turning on the switching element SW2 to open the fuel injection valve 40 during the valve-opening period of the fuel injection valve 40 in which the switching element SW4 is turned on, and the circuit for maintaining the valve-opening state of the fuel injection valve 40 by turning on the switching element SW3 during the valve-opening period of the fuel injection valve 40 in which the switching element SW4 is turned on. However, as long as the fuel injection valve 40 can be turned on and turned off, only one of these circuits may be provided.

Figure 3:
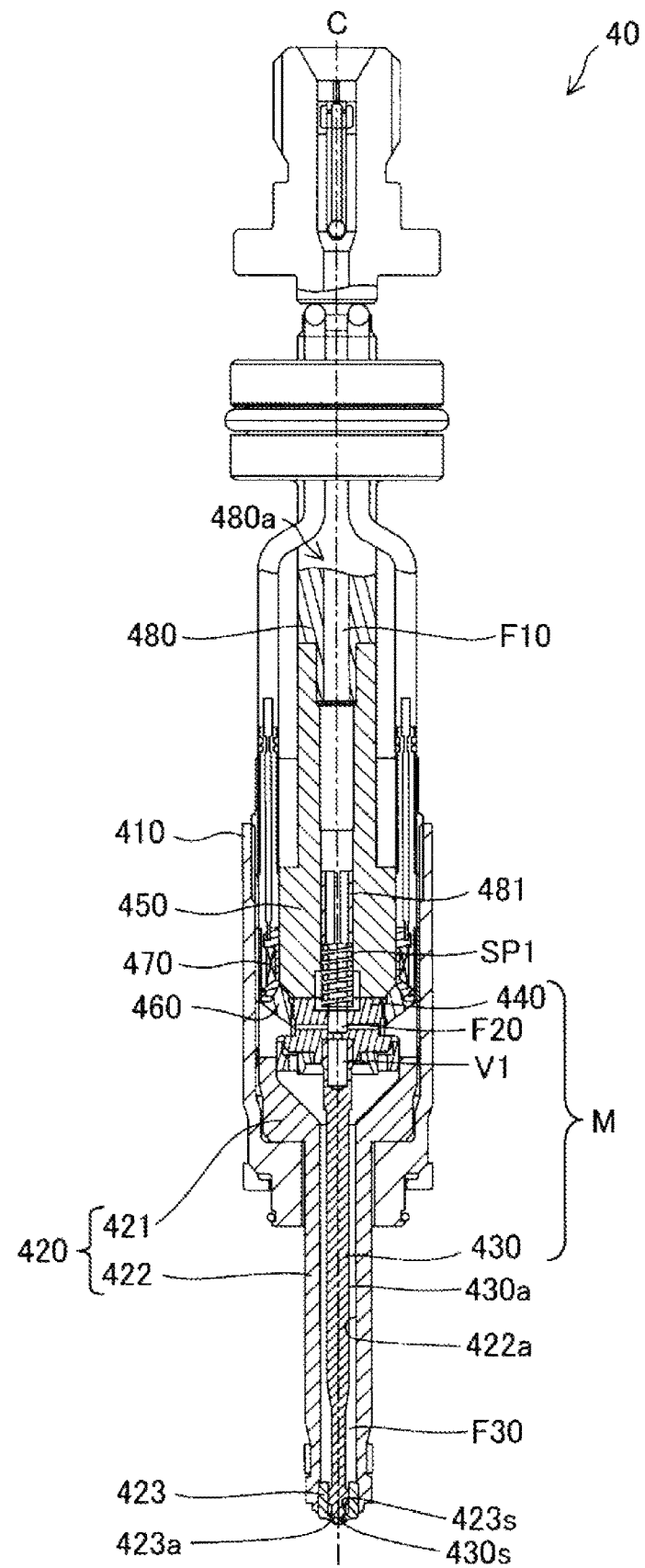
FIG. 3 is an explanatory view showing a configuration of the fuel injection valve of the first embodiment.
Figure 4:
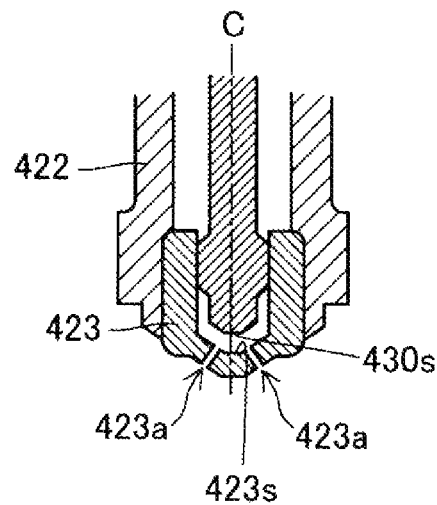
FIG. 4 is an enlarged explanatory view showing a vicinity of injection holes of the fuel injection valve.
Figure 5:
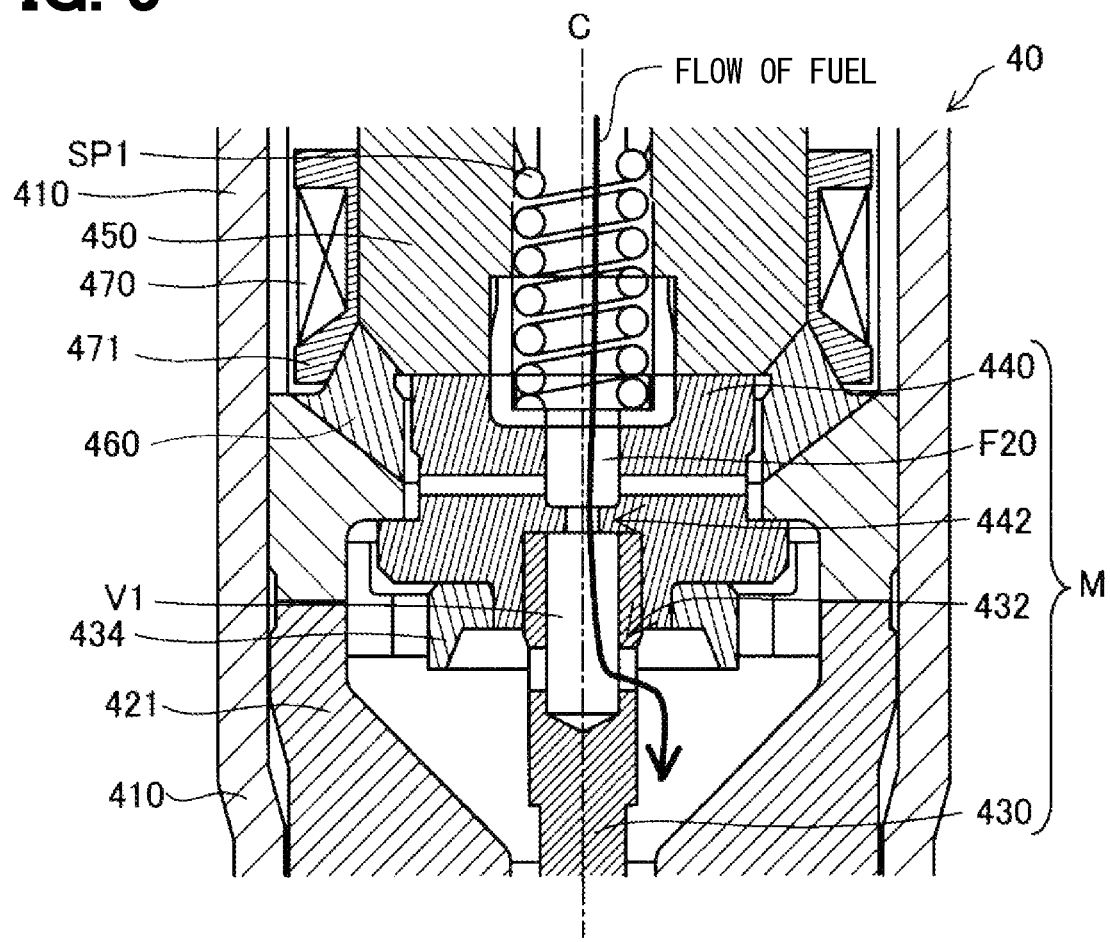
FIG. 5 is an enlarged explanatory view showing a vicinity of a core of the fuel injection valve of the first embodiment.

The configuration of the fuel injection valve 40 will be schematically described with reference to FIGS. 3 to 5. FIG. 3 is an overall view of the fuel injection valve 40, and FIG. 4 is an enlarged view of a distal end portion of the fuel injection valve 40. FIG. 5 is an enlarged explanatory view showing a vicinity of a movable core 440. As shown in FIG. 3, the fuel injection valve 40 includes a valve main body 410, a nozzle body 420, a valve element 430, the movable core 440, a stationary core 450, a non-magnetic member 460, an electromagnetic coil 470, a pipe connection 480 which are coaxially assembled such that a central axis C thereof coincide with each other.

The valve main body 410 is made of metal and is shaped in a cylindrical form that extends in an axial direction of the central axis C (also referred to as an axis C) of the fuel injection valve 40.

The nozzle body 420 is made of metal. The nozzle body 420 includes a main body portion 421 inserted into and joined to the valve main body 410 and a nozzle portion 422 extending from the main body portion 421 to the outside of the valve main body 410. The nozzle portion 422 is shaped in a cylindrical form that extends in the axial direction of the axis C, and an injection hole member 423 is installed to a distal end of the nozzle portion 422.

The injection hole member 423 is made of metal and is fixed to the nozzle portion 422 by welding. As shown in FIG. 4, the injection hole member 423 is shaped in a bottomed cylindrical form that extends in the axial direction of the axis C. A plurality of injection holes 423a for injecting the fuel is formed at a distal end of the injection hole member 423. A seat surface 423s, relative to which the valve element 430 is seated and lifted, is formed at an inner peripheral surface of the injection hole member 423.

The valve element 430 is made of metal and is shaped in a cylindrical form that extends in the axial direction of the axis C. Since the valve element 430 is shaped in the cylindrical form, the valve element 430 is also referred to as a needle 430. The valve element 430 is installed at an inside of the nozzle body 420 and is movable in the axial direction of the axis C. A flow passage F30, which is shaped in an annular form, is formed between an outer peripheral surface 430a of the valve element 430 and an inner peripheral surface 422a of the nozzle body 420 and extends in the axial direction of the axis C to conduct the fuel. A seating surface 430s, which is shaped in a ring form, is formed at an end portion of the valve element 430, which is located on the injection hole 423a side. The seating surface 430s of the valve element 430 is liftable away from and is seatable against the seat surface 423s of the injection hole member 423 in response to valve-opening movement and valve-closing movement of the valve element 430, respectively.

As shown in FIG. 5, the movable core 440 is installed to an end portion of the valve element 430 which is opposite to the injection holes 423a. The movable core 440 is made of metal and is shaped in a circular disk form. The movable core 440 is received at an inside of the main body portion 421 which is shaped in a cylindrical form. The movable core 440 cooperates with the valve element 430 and a sliding member 434 described later to form a movable arrangement M that is movable in the axial direction of the axis C. The movable arrangement M has a movable flow passage F20 that extends in the axial direction of the axis C and conducts the fuel.

The stationary core 450 is received and is fixed at an inside of the valve main body 410. The stationary core 450 is made of metal and is shaped in a ring form that circumferentially extends about the axis C. The non-magnetic member 460 is placed between the stationary core 450 and the main body portion 421 and is shaped in a ring form. The non-magnetic member 460 is made of a material with a weaker magnetism compared to the stationary core 450 and the movable core 440. In contrast, the stationary core 450, the movable core 440 and the main body portion 421 are made of a magnetic material.

The electromagnetic coil 470 is placed on a radially outer side of the non-magnetic member 460 and the stationary core 450. The electromagnetic coil 470 is wound around a bobbin 471 made of resin. The bobbin 471 is shaped in a cylindrical form centered on the axis C. Therefore, the electromagnetic coil 470 is arranged in a ring form that circumferentially extends about the axis C.

The pipe connection 480, which forms a flow inlet 480a of the fuel and is connected to an external pipe, is located on a side of the stationary core 450 which is opposite to the injection holes 432a. The pipe connection 480 is made of a metal member that is integrated with the stationary core 450. The fuel, which is pressurized by the high-pressure pump 60 (see FIG. 2), is supplied to the fuel injection valve 40 through the flow inlet 480a. A flow passage F10, which extends in the axial direction of the axis C and conducts the fuel, is formed at an inside of the pipe connection 480. A press-fitting member 481 is securely press fitted into the flow passage F10.

A resilient member SP1 is placed on the injection hole 423a side of the press-fitting member 481. One end of the resilient member SP1 is supported by the press-fitting member 481, and the other end of the resilient member SP1 is supported by the movable core 440. Therefore, an amount of resilient deformation of the resilient member SP1 at the time of valve-opening movement of the valve element 430 to a full lift position is specified by an amount of press-fitting of the press-fitting member 481, i.e., a fixed position of the press-fitting member 481 in the axial direction of the axis C. Specifically, a valve-closing force (a set load) of the resilient member SP1 is adjusted by the amount of press-fitting of the press-fitting member 81.

Next, an operation of the fuel injection valve 40 will be described.

When the controller 70 (see FIG. 2) energizes the electromagnetic coil 470 of the fuel injection valve 40, a magnetic field is generated around the electromagnetic coil 470. Specifically, a magnetic circuit, which forms a passage of a magnetic flux, is formed at the stationary core 450, the movable core 440 and the main body portion 421 in response to the energization. The movable core 440 is magnetically attracted to the stationary core 450 by a magnetic force generated by the magnetic circuit. A valve-closing force generated by the resilient member SP1, a valve-closing force generated by the fuel pressure, and a valve-opening force generated by the above-described magnetic force are applied to the movable arrangement M. In the fuel injection valve 40, the valve-opening force generated at the energization time is set to be larger than the above-described valve-closing forces. Thus, when the magnetic force is generated in response to the energization, the movable core 440 is moved together with the valve element 430 toward the stationary core 450. In this way, the valve element 430 is moved in a valve-opening direction away from the seat surface 423s so that the seating surface 430s is lifted from the seat surface 423s. Thus, the high-pressure fuel is injected from the injection holes 423a.

When the controller 70 stops the energization of the electromagnetic coil 470, the valve-opening force generated by the above-described magnetic force is lost. Thus, the movable core 440 and the valve element 430 are driven to make a valve-closing movement in a valve-closing direction toward the seat surface 423s by the valve-closing force generated by the resilient member SP1 and the valve-closing force generated by the fuel pressure. Therefore, the seating surface 430s is seated against the seat surface 423s. Therefore, the valve element 430 executes the valve-closing movement, and the fuel injection from the injection holes 423a is stopped. At this time, a first flow-restricting portion 442 and a second flow-restricting portion (a second restricting portion) 432 limit the moving speed of the seating surface 430s of the valve element 430 at the time of seating the seating surface 430s against the seat surface 423s so that rebound of the valve element 430 and wearing of the seating surface 430s and the seat surface 423s are limited.

Figure 6:
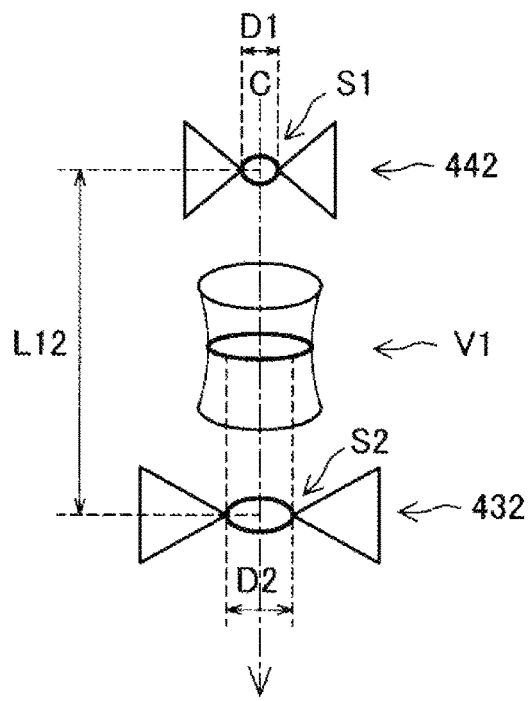
FIG. 6 is an explanatory diagram schematically showing a relationship between flow-restricting portions and a volume of the first embodiment.

The movable flow passage F20 has the first flow-restricting portion 442 and the second flow-restricting portion 432 each of which reduces a cross-sectional area of a corresponding portion of the movable flow passage F20. The first flow-restricting portion 442 and the second flow-restricting portion 432 function as damping elements that reduce and limit the speed of the valve element 430 at the valve-closing time. As shown in FIG. 6, a cross-sectional area of the movable flow passage F20 is increased and decreased along the axis C. The term "flow-restricting portion" refers to a location where the cross-sectional area changes from decreasing to increasing, i.e., a portion where the cross-sectional area becomes the minimum. The first flow-restricting portion 442 is formed on the axis C. The second flow-restricting portion 432 is formed by a plurality of holes (restricting holes) respectively placed at positions which are eccentric from the axis C so that these holes are not coaxial. The first flow-restricting portion 442 and the second flow-restricting portion 432 are axially spaced from each other by a distance L12. The distance L12 is a shortest distance axially connecting between the hole, which forms the first flow-restricting portion 442, and the plurality of holes, which form the second flow-restricting portion 432. The distance L12 is larger than an equivalent diameter of a larger one of an opening cross-sectional area S1 of the first flow-restricting portion 442 and an opening cross-sectional area S2 of the second flow-restricting portion 432. The equivalent diameter means a characteristic length indicating a size of a subject flow passage is equivalent to a cross-sectional area of a circular tube of what diameter in view of fluid flow. In a case where the flow passage is divided into a plurality of passages (holes), the equivalent diameter indicates a sum of cross-sectional areas of the plurality of flow passages (holes) is equivalent to a cross-sectional area of a circular tube of what diameter. A space between the first flow-restricting portion 442 and the second flow-restricting portion 432 is referred to as a volume V1.

FIG. 6 is an explanatory diagram schematically showing a relationship among the first flow-restricting portion 442, the second flow-restricting portion 432 and the volume V1 in the first embodiment. As shown in FIG. 6, the volume V1 is formed between the first flow-restricting portion 442 and the second flow-restricting portion 432. The cross-sectional area S2 (an equivalent diameter D2) of the second flow-restricting portion 432 is larger than the cross-sectional area S1 (an equivalent diameter D1) of the first flow-restricting portion 442. Here, the equivalent diameter means the characteristic length indicating the size of the subject flow passage is equivalent to the cross-sectional area of a circular tube of what diameter in view of fluid flow. In the above example, the cross-sectional area $S1=\pi \times$(equivalent diameter $D1)^2/4$, and the cross-sectional area $S2=\pi \times$(equivalent diameter $D2)^2/4$. Furthermore, the distance L12 between the first flow-restricting portion 442 and the second flow-restricting portion 432 is larger than the equivalent diameter D2 of the second flow-restricting portion 432 which is a flow-restricting portion having a large cross-sectional area.

As described above, when the controller 70 stops the energization of the electromagnetic coil 470, the valve-opening force generated by the magnetic force described above is lost. Therefore, the movable core 440 and the valve element 430 are moved in the valve-closing direction by the valve-closing force generated by the resilient member SP1 and the valve-closing force generated by the fuel pressure so that the seating surface 430s of the valve element 430 is seated against the seat surface 423s. A pressure wave is generated when the valve element 430 is seated.

Figure 7:
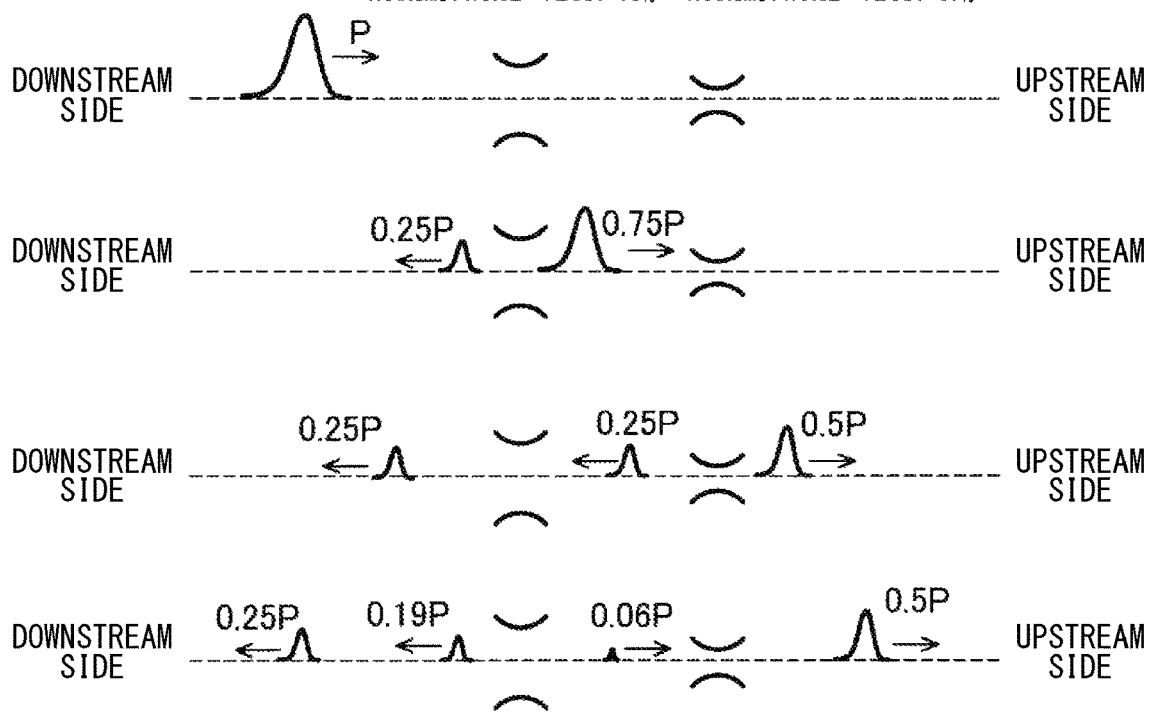
FIG. 7 is an explanatory diagram showing movement of a pressure wave in the first embodiment.

The effect of the flow-restricting portions at the time of generating the pressure wave will be described with reference to FIG. 7. In FIG. 7, a horizontal axis indicates a position along the fuel injection valve 40, and the right side is the upstream side, and the left side is the downstream side, i.e., the injection hole 423a side. The vertical axis indicates a magnitude of the pressure wave. In FIG. 7, at the second flow-restricting portion (second restricting portion) 432 placed at the downstream side, the reflectance of the pressure wave is set to about 25%, and the transmittance of the pressure wave is set to about 75%. Furthermore, at the first flow-restricting portion (first restricting portion) 442 placed at the upstream side, the reflectance of the pressure wave is set to about 33%, and the transmittance of the pressure wave is set to about 67%. Here, the reflectance and the transmittance indicate how large the pressure wave is reflected and transmitted when the pressure wave of a certain magnitude arrives. Therefore, when the pressure wave reaches the second flow-restricting portion 432, the second flow-restricting portion 432 reflects the pressure wave having a magnitude of about 25% and transmits the pressure wave having a magnitude of about 75%. Furthermore, when the pressure wave reaches the first flow-restricting portion 442, the first flow-restricting portion 442 reflects the pressure wave having a magnitude of about 33% and transmits the pressure wave having a magnitude of about 67%. When these two flow-restricting portions 432, 442 are viewed as a whole, the pressure wave having a magnitude of about 50% passes through the two flow-restricting portions 432, 442. Here, the magnitude of the reflectance and the magnitude of the transmittance depend on the cross-sectional area of the flow-restricting portion or the equivalent diameter of the flow-restricting portion. When the cross-sectional area of the flow-restricting portion is reduced, the reflectance becomes high, and the transmittance becomes low. In contrast, when the cross-sectional area of the flow-restricting portion is increased, the reflectance becomes low, and the transmittance becomes high. By forming the flow-restricting portion, it is possible to control the moving speed of the movable arrangement M at the valve-opening time and the valve-closing time of the valve element 430. Therefore, the size of the flow-restricting portion is determined according to a target value of the moving speed of the movable arrangement M. The values of reflectance and transmittance used in FIG. 7 and the description are values that are set for the convenience of description.

When the injection holes 423a are closed through the valve-closing movement of the valve element 430, a pressure wave having a high pressure is generated by the water-hammer action. Then, as shown in FIG. 7, the pressure wave moves from the downstream to the upstream. The magnitude of the pressure wave at this time is assumed to be P. When the pressure wave reaches the second flow-restricting portion (second restricting portion) 432, the second flow-restricting portion 432 reflects about 0.25P of the pressure wave and transmits about 0.75P of the pressure wave. When the second flow-restricting portion 432 reflects the pressure wave, the movable arrangement M is moved toward the upstream side and thereby exerts a force in the valve-opening direction for inducing the valve-opening. Specifically, a force F1 corresponding to the reflected pressure wave having the magnitude of about 0.25P is applied to the movable arrangement M toward the upstream side. Thereafter, when the pressure wave, which has passed through the second flow-restricting portion 432 and has the magnitude of about 0.75P, reaches the first flow-restricting portion (first restricting portion) 442, the first flow-restricting portion 442 reflects the pressure wave having the magnitude of about 0.25P and transmits the pressure wave having the magnitude of about 0.5P. At this time as well, a force F2 corresponding to the reflected pressure wave having the magnitude of about 0.25P is applied to the movable arrangement M toward the upstream side. In the present embodiment, a time point, at which the force F2 is applied to the movable arrangement M, is delayed from a time point, at which the force F1 is applied to the movable arrangement M, by a time period required for the pressure wave to move through the length L12. That is, since the forces F1, F2 are not applied to the movable arrangement M at the same time but are applied with a time lag, the force applied to the movable arrangement M at once is unlikely to be larger than the sum of the valve-closing force generated by the resilient member SP1 and the valve-closing force generated by the fuel pressure. Therefore, it is possible to limit the event that the valve element 430 is placed in the valve-opening state by the water-hammer action generated at the valve-closing time. By providing the second flow-restricting portion 432 and the first flow-restricting portion 442 in this way, the force, which is applied by the pressure wave against the movable arrangement M to move the movable arrangement M toward the upstream side to induce the valve opening, can be dispersed relative to the time axis. Thereby, the valve-opening movement of the valve element 430 caused by the water-hammer action can be limited.

Figure 8:
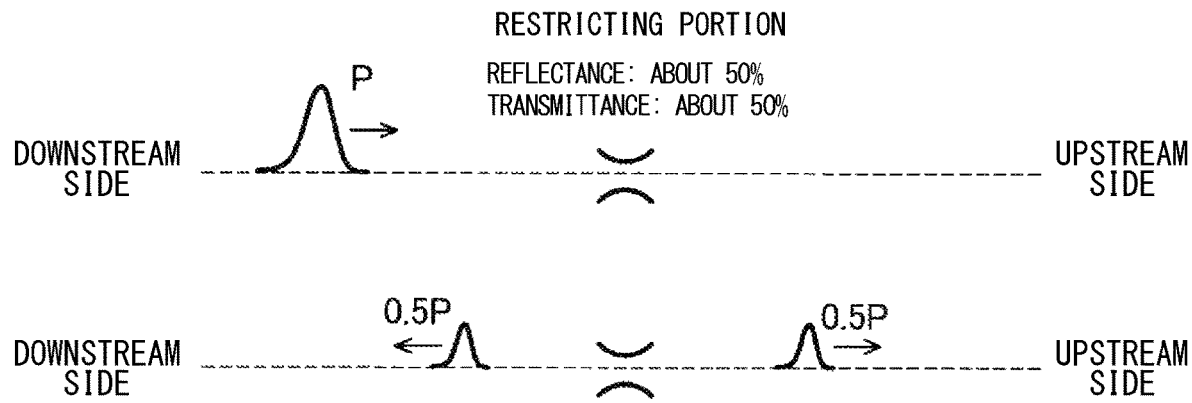
FIG. 8 is an explanatory diagram showing movement of a pressure wave in a comparative example.

As a comparative example, there will be described a case where there is provided only one flow-restricting portion. In order to reduce the number of the flow-restricting portions to one, only one of the flow-restricting portions 442, 432 shown in FIG. 6 may be left in the movable arrangement M. In the comparative example shown in FIG. 8, in order to make the magnitude of the pressure wave transmitted through the flow-restricting portion (restricting portion) substantially equal to that of the first embodiment, the reflectance at the flow-restricting portion is set to about 50%, and the transmittance is set to about 50%. In the comparative example, when the pressure wave having the magnitude P reaches the flow-restricting portion, the flow-restricting portion reflects the pressure wave having a magnitude of about 0.5P and transmits the pressure wave having a magnitude of about 0.5P. At this time, due to the reaction applied to the movable arrangement M at the time of reflecting the pressure wave at the flow-restricting portion, the movable arrangement M is moved toward the upstream side and thereby exerts a force in the valve-opening direction for inducing the valve opening. That is, a force F3 corresponding to a reflected pressure wave having a magnitude of about 0.5P is applied to the movable arrangement M toward the upstream side. When the magnitude of this force F3 becomes larger than a sum of the valve-closing force generated by the resilient member SP1 and the valve-closing force generated by the fuel pressure, the valve opening occurs.

When the magnitudes of the forces F1, F2, F3 in the first embodiment and the comparative example are compared, there is a relationship of F2<F1<F3. Therefore, in the first embodiment, the forces F1, F2 applied to the movable arrangement M are smaller than the force F3 applied to the movable arrangement M in the comparative example, and thereby the valve-opening movement of the valve element 430 in the valve-opening direction caused by the pressure wave is less likely to occur. In the case where there is provided only one flow-restricting portion in the movable arrangement M as in the comparative example, when the water hammer (pressure wave) generated at the valve-closing time of the valve element 430 reaches the flow-restricting portion, the reflected pressure wave, which cannot be transmitted through the flow-restricting portion and is thereby reflected at the flow-restricting portion, is applied to the movable arrangement M at once as a force exerted in the valve-opening direction. The present application intends to reduce the moving speed of the movable arrangement M to a target value and to reduce the force applied to the movable arrangement M by the water hammer in the valve-opening direction. As described above, in order to reduce the moving speed of the movable arrangement M, it is necessary to form the flow-restricting portion at the movable arrangement M. However, when the flow-restricting portion is formed at a location other than the movable arrangement M to reduce the force (the pressure wave generated by the water hammer) applied to the movable arrangement M in the valve-opening direction, a pressure loss of the fuel of the injector as a whole becomes large. Therefore, in the present application, the required flow-restricting amount at the movable arrangement M (the flow-restricting amount required to reduce the moving speed of the movable arrangement M) is achieved by dividing the required flow-restricting amount at the plurality of flow-restricting portions. Thereby, it is also possible to reduce the force generated by the water hammer only by the flow-restricting amount required to reduce the moving speed of the movable arrangement M.

Figure 9:
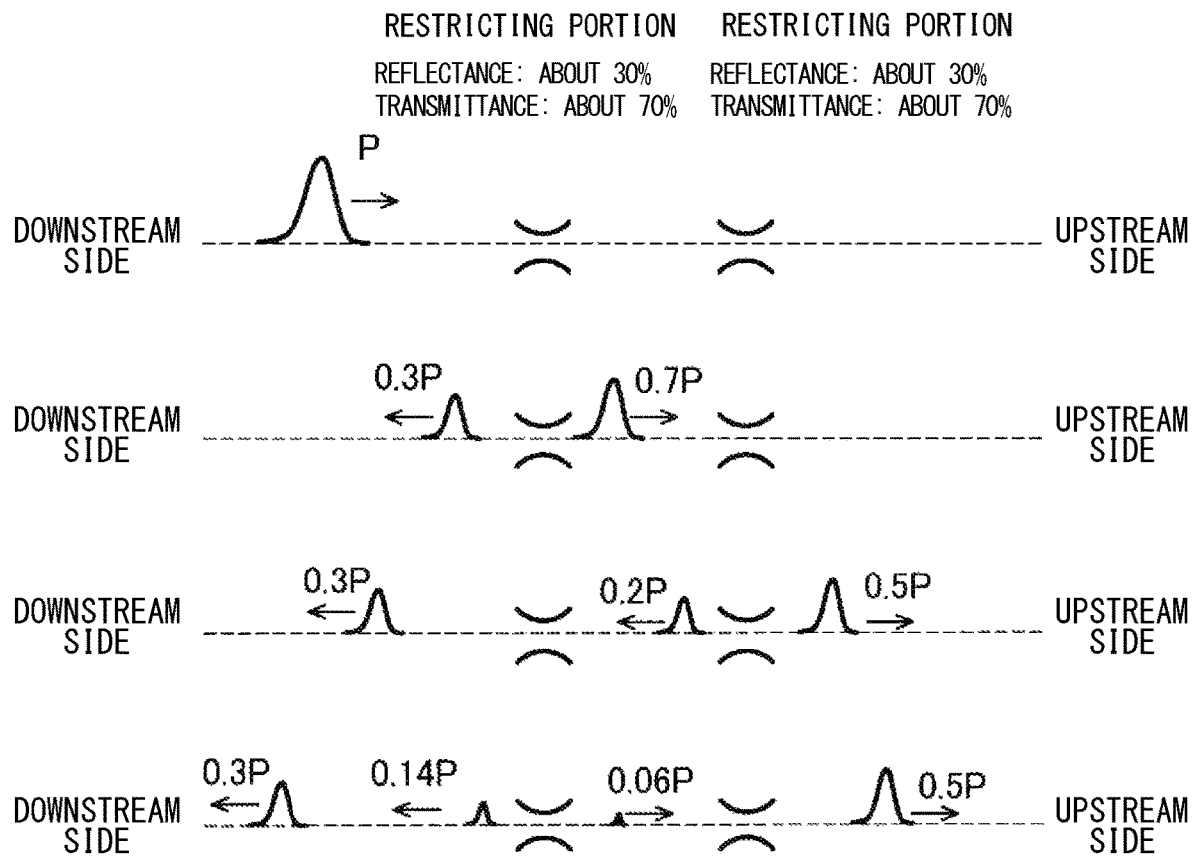
FIG. 9 is an explanatory diagram showing movement of a pressure wave in a modification of the first embodiment.

In another embodiment shown in FIG. 9, two flow-restricting portions (restricting portions) are provided, and the magnitude of the pressure wave passing through the respective flow-restricting portions is set to be substantially the same as that of the first embodiment. Specifically, in this modification, the reflectance of each of the two flow-restricting portions is about 30%, and the transmittance of each of the two flow-restricting portions is about 70%. Furthermore, the cross-sectional areas S1, S2 of these two flow-restricting portions are almost equal to each other. In this modification, when the pressure wave having the magnitude P reaches the second flow-restricting portion 432 located on the downstream side, the second flow-restricting portion 432 reflects the pressure wave having a magnitude of about 0.3P and transmits the pressure wave having a magnitude of about 0.7P. When the second flow-restricting portion 432 reflects the pressure wave, the movable arrangement M is moved toward the upstream side and thereby exerts a force in the valve-opening direction for inducing the valve opening. That is, a force F4 corresponding to the reflected pressure wave having the magnitude of about 0.3P is applied to the movable arrangement M toward the upstream side. Thereafter, when the pressure wave, which has passed through the second flow-restricting portion 432 and has the magnitude of about 0.7P, reaches the first flow-restricting portion 442 located on the upstream side, the first flow-restricting portion 442 reflects the pressure wave having a magnitude of about 0.2P and transmits the pressure wave having a magnitude of about 0.5P. At this time as well, a force F5 corresponding to the reflected pressure wave having the magnitude of about 0.2P is applied to the movable arrangement M toward the upstream side. In the first embodiment, a time point, at which the force F5 is applied to the movable arrangement M, is delayed from a time point, at which the force F4 is applied to the movable arrangement M, by a time period required for the pressure wave to move through the length L12. That is, since the forces F4, F5 are not applied to the movable arrangement M at the same time but are applied with a time lag, the force applied to the movable arrangement M at once is unlikely to be larger than the sum of the valve-closing force generated by the resilient member SP1 and the valve-closing force generated by the fuel pressure. Therefore, it is possible to limit the event that the valve element 430 is placed in the valve-opening state by the water-hammer action generated at the valve-closing time.

As described above with reference to FIG. 7, when the cross-sectional area S2 (the equivalent diameter D2) of the second flow-restricting portion 432 on the downstream side is larger than the cross-sectional area S1 (the equivalent diameter D1) of the first flow-restricting portion 442, the magnitude of the force F1 and the magnitude of the force F2 can be made substantially equal to each other. Therefore, the forces, which are applied to the movable arrangement M to move the movable arrangement M toward the upstream side, can be leveled, which is preferable.

In the first embodiment, the cross-sectional area S2 of the second flow-restricting portion 432 located on the downstream side is made larger than the cross-sectional area S1 of the first flow-restricting portion 442 located on the upstream side. Furthermore, in the other embodiment described above, the cross-sectional area S2 of the second flow-restricting portion 432 is made substantially equal to the cross-sectional area S1 of the first flow-restricting portion 442. Alternatively, the cross-sectional area S1 of the first flow-restricting portion 442 located on the upstream side may be made larger than the cross-sectional area S2 of the second flow-restricting portion 432 located on the downstream side. Even in this case, since the forces F1, F2 are not applied to the movable arrangement M at the same time but are applied with a time lag, the force applied to the movable arrangement M at once is unlikely to be larger than the sum of the valve-closing force generated by the resilient member SP1 and the valve-closing force generated by the fuel pressure. Therefore, it is possible to limit the event that the valve element 430 is placed in the valve-opening state by the water-hammer action generated at the valve-closing time.

In the first embodiment, since the plurality of second flow-restricting portions 432 are placed at positions eccentric from the axis C, the direction of the force F1 applied to the second flow-restricting portion 432 intersects a moving direction of the valve element 430. Therefore, the force, which is applied to the valve element 430 in the valve-opening direction, is only a part of the force F1. Therefore, it is possible to make it more difficult to cause the valve-opening of the valve element 430. The second flow-restricting portion 432 may be provided on the same axis as the axis C. A radial size of the fuel injection valve 40 can be reduced.

In the first embodiment, the second flow-restricting portion 432 is formed by the plurality of holes. When the second flow-restricting portion 432 is formed of the plurality of holes, the valve element 430 can be made less likely to tilt when receiving the pressure wave, as compared with an imaginary case where the second flow-restricting portion 432 has only one hole. Here, it is preferable that the plurality of holes of the second flow-restricting portion 432 are respectively placed at a plurality of positions which are evenly arranged and are arranged, for example, in a rotational symmetry about the axis C. The valve element 430 can be made less likely to tilt when it receives the pressure wave.

In the present embodiment, the opening cross-sectional area S1 of the first flow-restricting portion 442 forms a smallest cross-sectional area of the movable flow passage F20, and the opening cross-sectional area S2 of the second flow-restricting portion 432 forms a second smallest cross-sectional area of the movable flow passage F20. The portion of the movable flow passage F20, which has the smallest cross-sectional area, most reflects the pressure wave. That is, the force of the water hammer acting on the movable arrangement M by reflection is the largest at this portion of the movable flow passage F20. Here, when the first flow-restricting portion 442 is formed as the flow-restricting portion having the smallest cross-sectional area, the pressure wave having the reduced magnitude, which is reduced by the second flow-restricting portion 432, reaches the first flow-restricting portion 442 so that the force generated by the water hammer acting on the movable arrangement M can be reduced.

Second Embodiment

Figure 10:
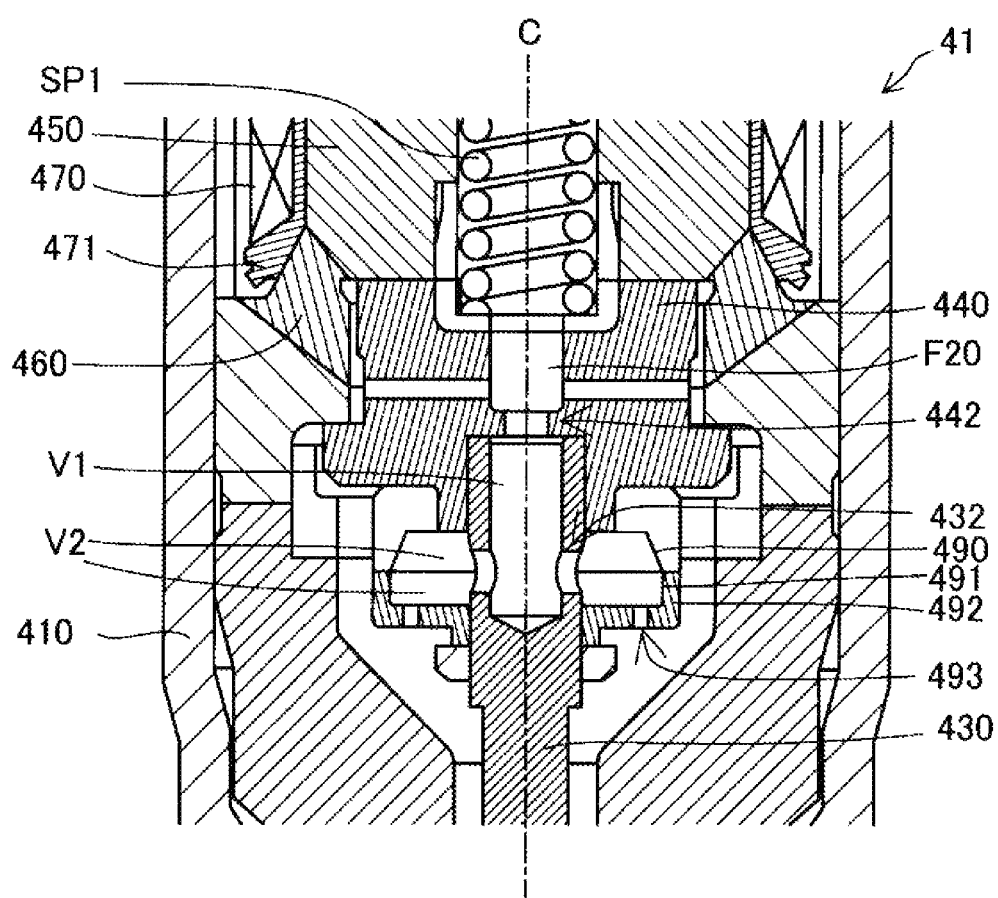
FIG. 10 is an enlarged explanatory view showing a vicinity of a core of a fuel injection valve of a second embodiment.

In the fuel injection valve 41 of the second embodiment, which is shown by enlarging the vicinity of the core in FIG. 10, in comparison to the fuel injection valve 40 of the first embodiment, a volume V2 is formed on the downstream side of the second flow-restricting portion 432, and a third flow-restricting portion 493 is formed on the downstream side of the volume V2. The volume V2 is a space which is shaped in a substantially torus form and is formed by an upper volume forming member 490, a lower volume forming member 491, and a sleeve 492. A lower side of the upper volume forming member 490 is opened, and an upper side and a lower side of the lower volume forming member 491 are opened. The volume V1 exists on the axis C, and the volume V2 is formed to surround a downstream-side portion of the volume V1 in a form of a torus ring. The sleeve 492 has a plurality of holes that form the third flow-restricting portion 493.

Figure 11:
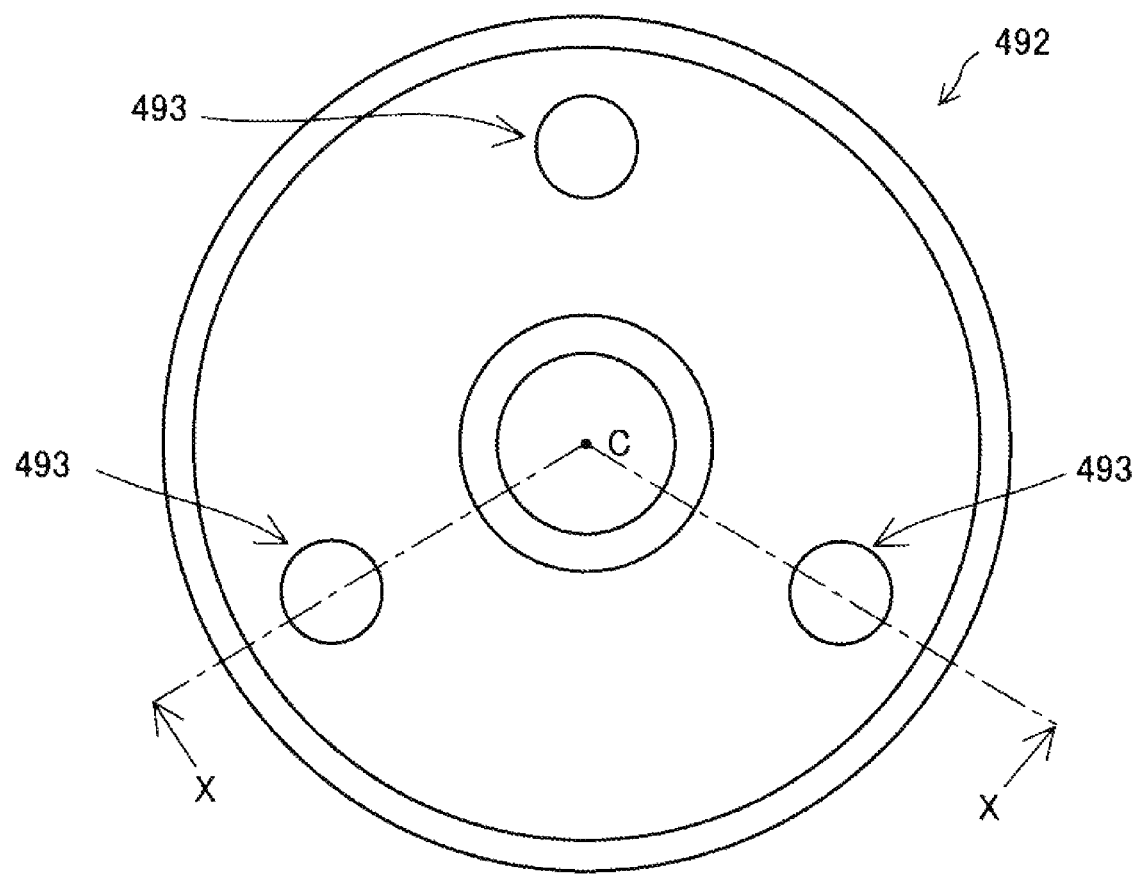
FIG. 11 is an explanatory view showing a sleeve of the fuel injection valve of the second embodiment.

As shown in FIG. 11, the sleeve 492 has three third flow-restricting portions 493, and these three third flow-restricting portions 493 are respectively placed at three positions arranged in a rotational symmetry about the axis C. The number of the flow-restricting portions 493 should not be limited to three and may be, for example, two or four or more. Furthermore, the sizes of these holes of the third flow-restricting portion 493 may be different from each other. FIG. 10 is a cross-sectional view of the fuel injection valve 41 taken along line X-X in FIG. 11.

Figure 12:
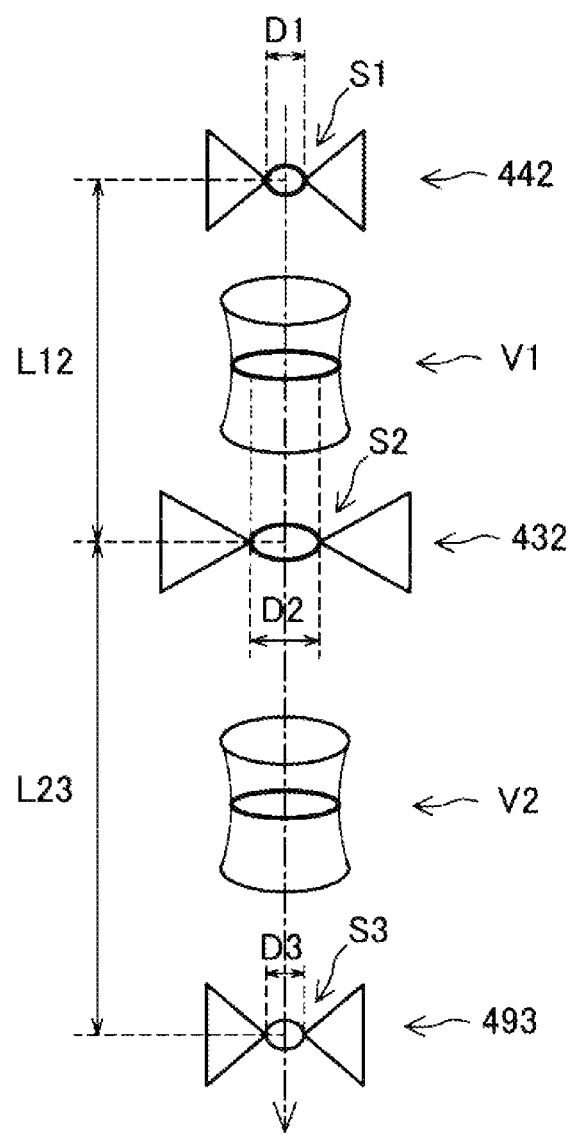
FIG. 12 is an explanatory diagram schematically showing a relationship between flow-restricting portions and volumes of the second embodiment.

FIG. 12 is an explanatory diagram schematically showing a relationship among the first flow-restricting portion 442, the second flow-restricting portion 432, the third flow-restricting portion 493 and the volumes V1, V2 in the second embodiment. Although the number of the third flow-restricting portions 493 is three in FIG. 11, these three third flow-restricting portions 493 are indicated as one equivalent flow-restricting portion in FIG. 12 that is equivalent to the three third flow-restricting portions 493. Furthermore, although the volume V2 is shaped in the substantially torus form in reality, the shape of the volume V2 is depicted as a substantially cylindrical form in FIG. 12 for the sake of convenience. As shown in FIG. 12, the volume V1 is formed between the first flow-restricting portion 442 and the second flow-restricting portion 432, and the volume V2 is formed between the second flow-restricting portion 432 and the third flow-restricting portion 493. A total cross-sectional area of the third flow-restricting portion 493 is S3, and an equivalent diameter of the third flow-restricting portion 493 is D3. A distance L23 between the second flow-restricting portion 432 and the third flow-restricting portion 493 is larger than the equivalent diameter D2 of the second flow-restricting portion 432. Although the equivalent diameter D3 is smaller than the equivalent diameter D2 in the example shown in FIG. 12, the equivalent diameter D3 may be equal to or larger than the equivalent diameter D2. When the equivalent diameter D3 is larger than the equivalent diameter D2, the distance L23 between the second flow-restricting portion 432 and the third flow-restricting portion 493 is larger than the equivalent diameter D3 of the third flow-restricting portion 493.

Figure 13:
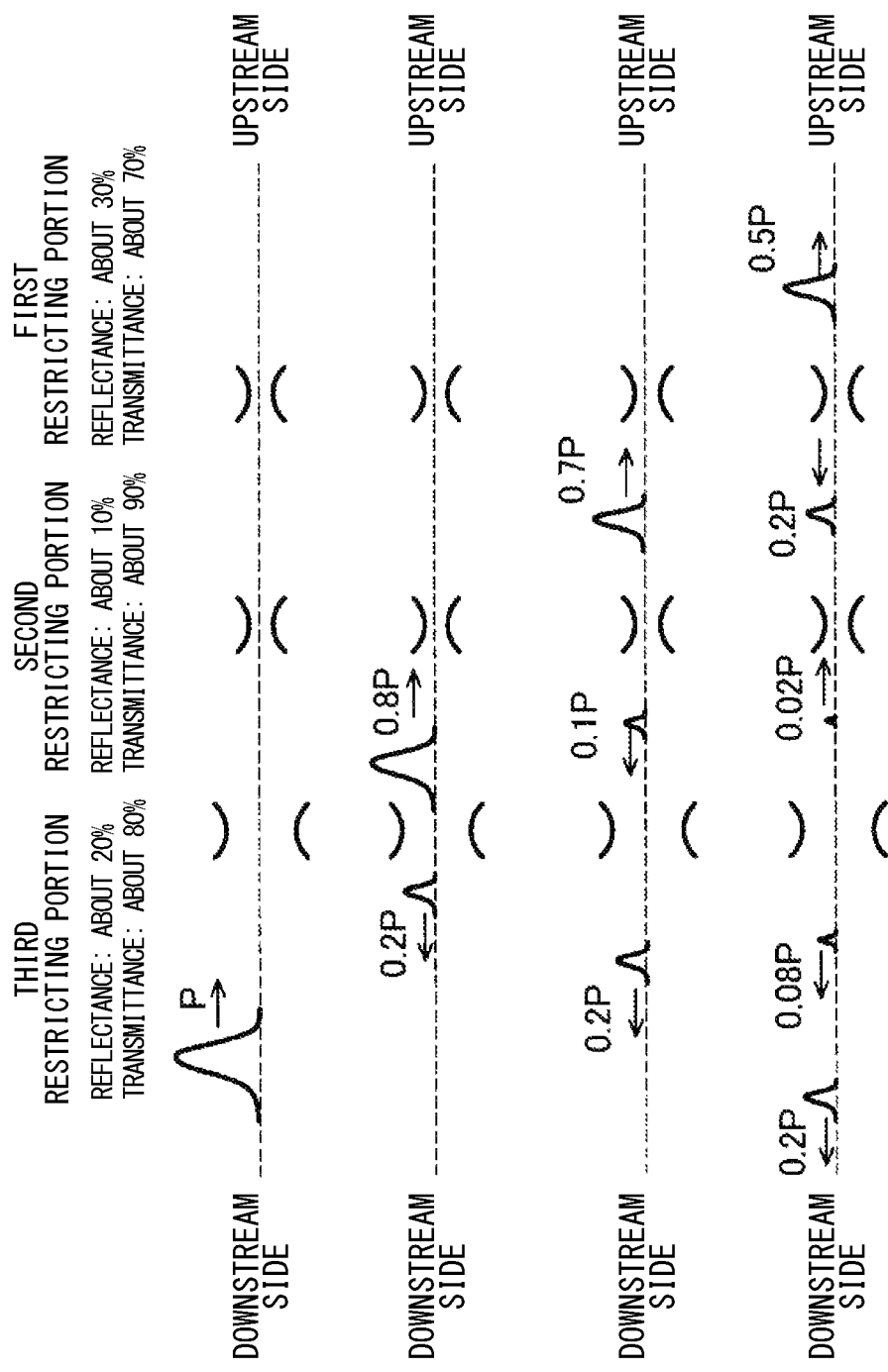
FIG. 13 is an explanatory diagram showing movement of a pressure wave in the second embodiment.

Like the description made in view of FIG. 7, the effects of the flow-restricting portions will be described with reference to FIG. 13. At the third flow-restricting portion (third restricting portion) 493, the reflectance of the pressure wave is set to about 20%, and the transmittance of the pressure wave is set to about 80%. At the second flow-restricting portion (second restricting portion) 432, the reflectance of the pressure wave is set to about 10%, and the transmittance of the pressure wave is set to about 90%. Furthermore, at the first flow-restricting portion (first restricting portion) 442, the reflectance of the pressure wave is set to about 30%, and the transmittance of the pressure wave is set to about 70%. Furthermore, the magnitude of the pressure wave transmitted through the respective flow-restricting portions is set to be the same as that of the first embodiment.

The pressure wave of a predetermined magnitude P is generated by the water-hammer action at the valve closing time. When the pressure wave of this magnitude P reaches the third flow-restricting portion 493, the third flow-restricting portion 493 reflects the pressure wave having a magnitude of about 0.2P and transmits the pressure wave having a magnitude of about 0.8P. When the third flow-restricting portion 493 reflects the pressure wave, the movable arrangement M is moved toward the upstream side and thereby exerts a force F6 in the valve-opening direction for inducing the valve opening. When the pressure wave, which has passed through the third flow-restricting portion 493, reaches the second flow-restricting portion 432, the second flow-restricting portion 432 reflects the pressure wave having a magnitude of about 0.1P and transmits the pressure wave having a magnitude of about 0.7P. When the second flow-restricting portion 432 reflects the pressure wave, the movable arrangement M is moved toward the upstream side and thereby exerts a force F7 in the valve-opening direction for inducing the valve opening. Next, when the pressure wave, which has passed through the second flow-restricting portion 432, reaches the first flow-restricting portion 442, the first flow-restricting portion 442 reflects the pressure wave having a magnitude of about 0.2P and transmits the pressure wave having a magnitude of about 0.5P. When the first flow-restricting portion 442 reflects the pressure wave, the movable arrangement M is moved toward the upstream side and thereby exerts a force F8 in the valve-opening direction for inducing the valve opening. In the second embodiment, a time point, at which the force F7 is applied, is delayed from a time point, at which the force F6 is applied, by a time period required for the pressure wave to move through the length L23. Furthermore, a time point, at which the force F8 is applied, is delayed from the time point, at which the force F7 is applied, by a time period required for the pressure wave to move through the length L12. That is, since the three forces F6, F7, F8 are not applied at the same time but are applied with a time lag, the force applied to the movable arrangement M at once is unlikely to be larger than the sum of the valve-closing force generated by the resilient member SP1 and the valve-closing force generated by the fuel pressure. Therefore, it is possible to limit the event that the valve element 430 is placed in the valve-opening state by the water-hammer action generated at the valve-closing time.

Figure 14:
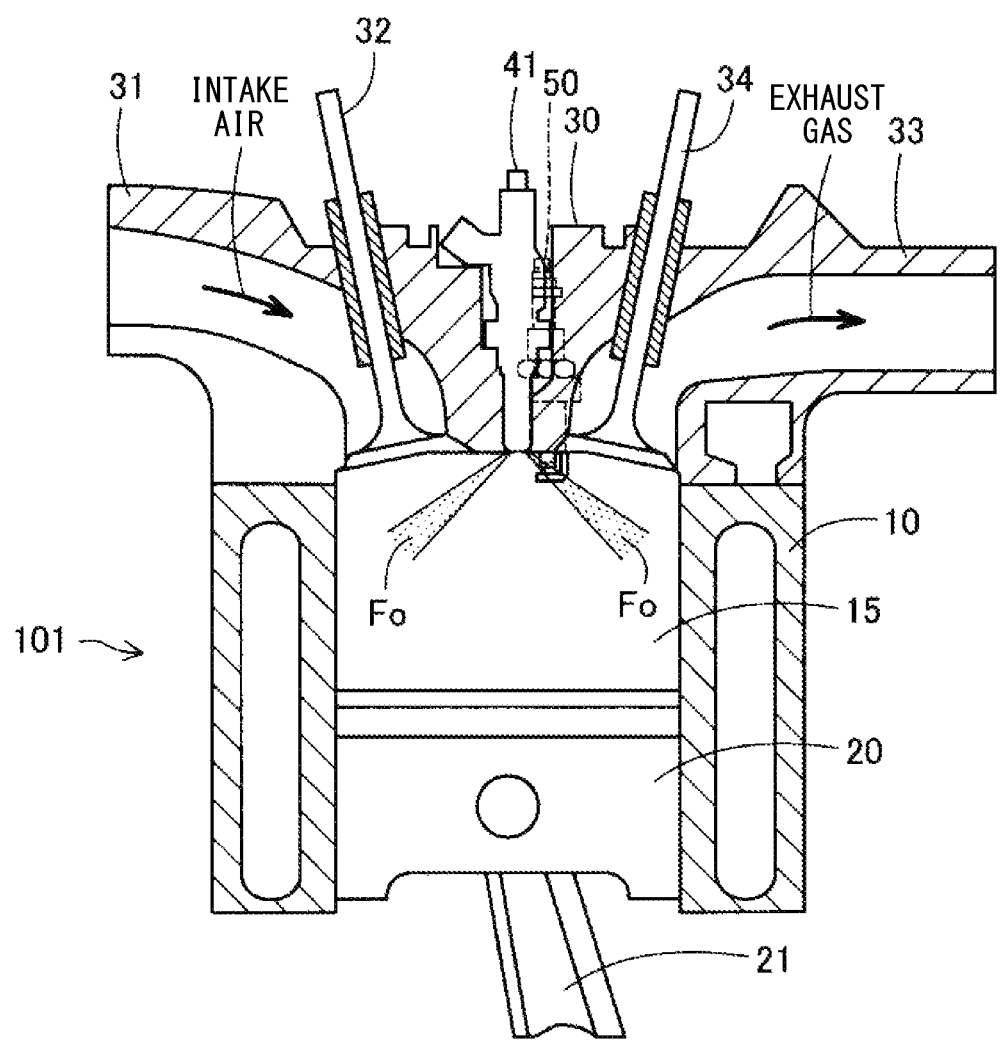
FIG. 14 is an explanatory view showing a schematic configuration of another engine system.

In the second embodiment, the volume V1 exits on the axis C and has the substantially cylindrical form, and the volume V2 has the torus form that surrounds the downstream-side portion of the volume V1. Therefore, a direction of the pressure, which is transmitted through the second flow-restricting portion 432, is a direction that is generally perpendicular to the axis C, and a direction of the force F7, which is generated by the pressure wave, is not a direction along the axis C. Thus, the force exerted in the valve-opening direction for inducing the valve opening of the valve element 430 is only a portion of the force F7. Therefore, it is possible to make it more difficult to cause the valve-opening of the valve element 430. Like the volume V1, the volume V2 may be placed on the axis C and may have a substantially cylindrical form. In such a case, a radial size of the fuel injection valve 41 can be reduced. Therefore, as shown in FIG. 14, the fuel injection valve 41 can be applied to an engine 101 in which the fuel injection valve 41 and the spark plug 50 are arranged adjacent to each other.

Figure 15:
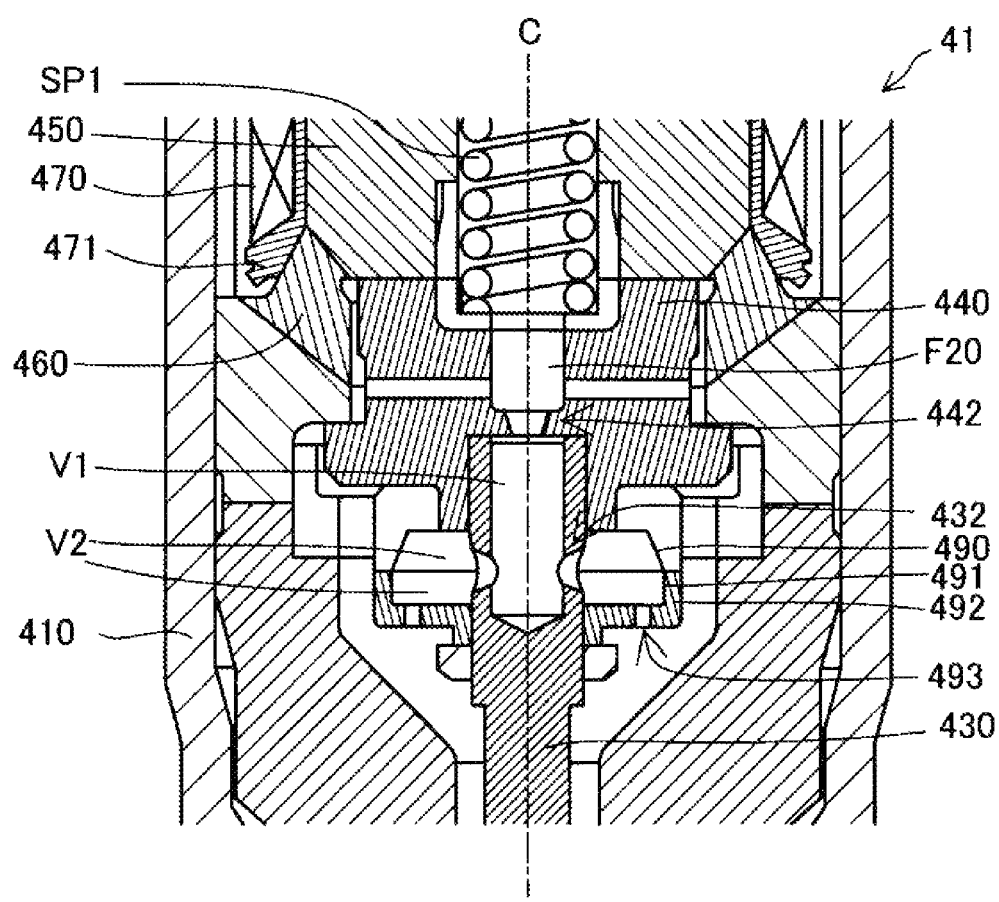
FIG. 15 is an enlarged explanatory view showing a vicinity of a core of a fuel injection valve of a modification of the second embodiment.

In the first and second embodiments described above, the first flow-restricting portion 442 and the second flow-restricting portion 432 have a configuration in which a certain length is extremely small. As shown in FIG. 15, the hole of the first flow-restricting portion 442 and the holes of the second flow-restricting portion 432 may respectively have a tapered form. In the example shown in FIG. 15, the hole of the first flow-restricting portion 442 is shaped in a tapered form that is tapered toward the downstream side, and each of the holes of the second flow-restricting portion 432 is shaped in a tapered form that is tapered toward the upstream side. In such a case, the flow-restricting portion 442, 432 refers to, in a narrow sense, a portion that is narrowest in the tapered form, i.e., a portion that has the smallest cross-sectional area in the tapered form. However, the entire tapered portion including the portion having the smallest cross-sectional area may be referred to as a flow-restricting portion.

In the first and second embodiments, the shape of the cross section of the respective flow-restricting portions 442, 432, 482 taken in a plane perpendicular to the fuel flow direction has not been mentioned, but the shape of the cross section is preferably a circular form. The circular form is easier to process than other forms. Further, since the circular form has a shorter peripheral length per cross-sectional area than other forms, it is not easily affected by the viscosity of the fuel flowing therethrough.

In the first and second embodiments, the movable arrangement M includes the valve element 430 (serving as the needle), and the valve element 430 is moved integrally with the movable arrangement M. In such a case, at the valve-closing time, the entire movable arrangement including the valve element 430 is stopped, and the water-hammer action is large. As described in the first and second embodiments, when the flow-restricting portions 442, 432, 482 are provided, the valve element 430 operates integrally with the movable arrangement M. Furthermore, even when the water-hammer action is large, the valve opening force, which is generated by the pressure wave, can be dispersed relative to the time axis. Therefore, the valve opening of the valve element 430 can be limited.

In the claims, it is described that the cross-sectional areas of the flow-restricting portions increase in the order of the first flow-restricting portion, the second flow-restricting portion, and the third flow-restricting portion. However, as described in the embodiments, the order of the sizes of the cross-sectional areas of the first flow-restricting portion 442, the second flow-restricting portion 432, and the third flow-restricting portion 493 can be any order. Therefore, there are cases where the first flow-restricting portion of the claims and the first flow-restricting portion 442 of the embodiments correspond to each other, but they do not necessarily correspond to each other. The same applies to the second flow-restricting portion and the third flow-restricting portion.

In each of the above embodiments, in a case where the pressure wave is reflected three times or more, there may be, for example, a case where the pressure wave, which is reflected at the first flow-restricting portion 442, is reflected at the second flow-restricting portion 432 and is further reflected at the first flow-restricting portion 442. However, from the second time onward, the force generated by the reflection is extremely small compared to the force generated by the first reflection, so that it can be ignored.

OTHER EMBODIMENTS

Figure 16:
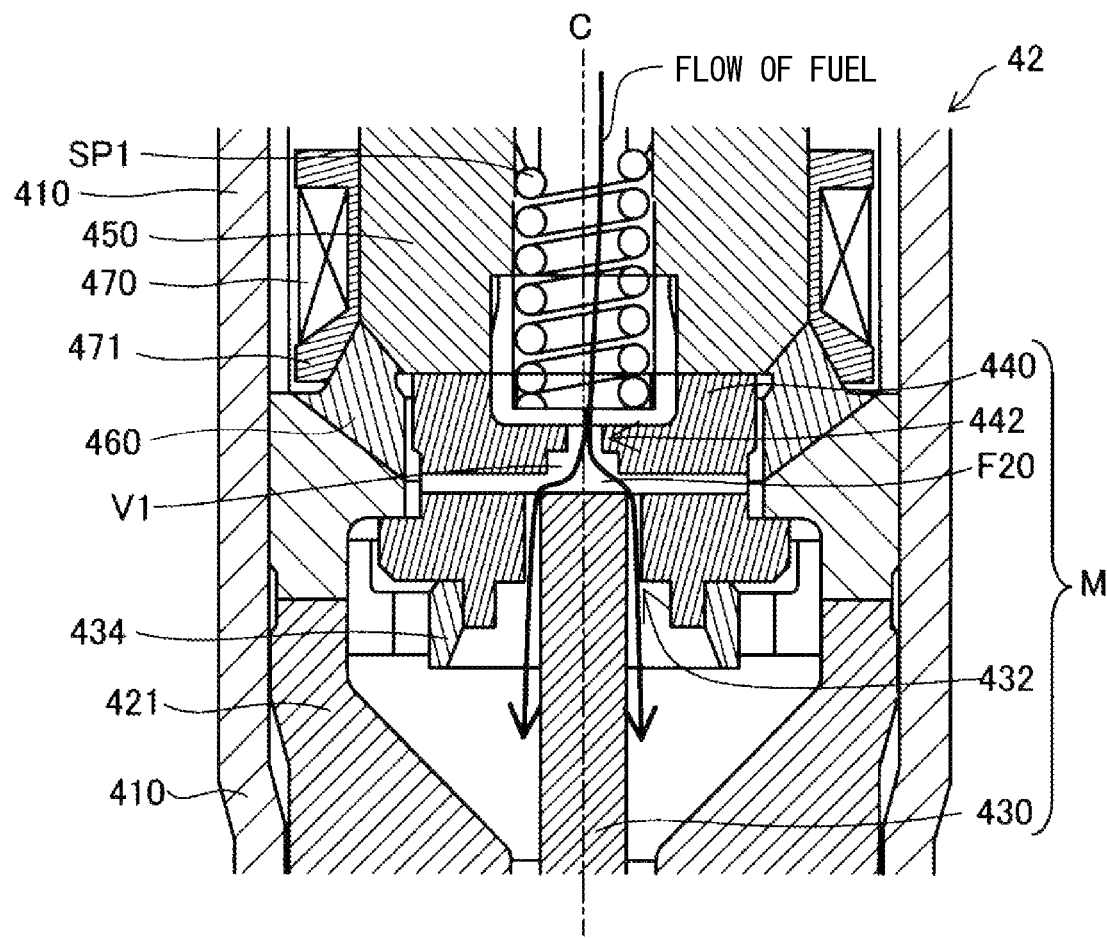
FIG. 16 is an enlarged explanatory view showing a vicinity of a core of a fuel injection valve of another embodiment.
Figure 17:
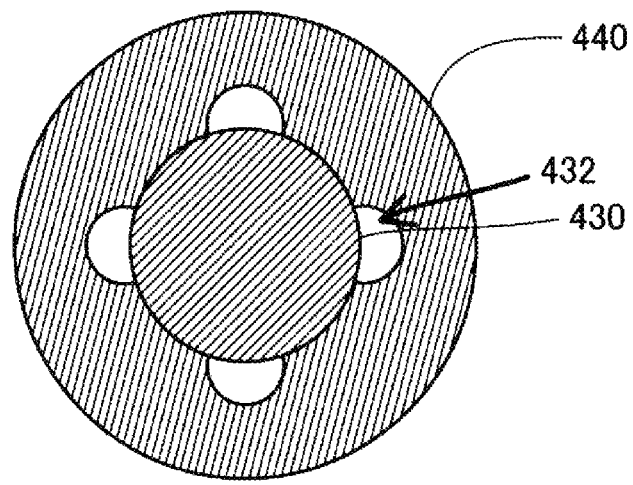
FIG. 17 is an explanatory view showing a second flow-restricting portion of the other embodiment.

A fuel injection valve 42 of another embodiment shown in FIG. 16 is an example in which the second flow-restricting portions 432 are provided at a boundary between the movable core 440 and the valve element 430. In this embodiment, as shown in FIG. 17, the second flow-restricting portions 432, each of which is shaped in a substantially semicircular form, are respectively placed at four positions arranged in a four-fold rotational symmetry and located on a boundary between the movable core 440 and the valve element 430. The first flow-restricting portion 442 is provided on the central axis C of the movable core 440 as in the first embodiment. In this embodiment, the flow passage F20 and the flow-restricting portions 442, 432 may be provided only in the movable arrangement M. The second flow-restricting portions 432 are not necessarily placed at the positions arranged in the four-fold rotational symmetry and may be placed at positions arranged in an n-fold rotational symmetry (n is a natural number of 2 or more).

The present disclosure should not be limited to the above-described embodiments, and can be realized with various configurations without departing from the spirit of the present disclosure. For example, the technical features of the embodiments corresponding to the technical features in each aspect described in the summary section may be appropriately replaced or combined to solve one or more or all of the above-mentioned disadvantages, or one or more or all of the above-mentioned effects. Further, if the technical feature(s) is not described as essential in the present specification, it can be appropriately deleted.

The present disclosure can be realized as the following forms.

According to one aspect of the present disclosure, there is provided a fuel injection valve including an injection hole for injecting fuel and a flow passage for conducting the fuel to the injection hole. The fuel injection valve includes: a coil that is configured to generate a magnetic flux when the coil is energized; a stationary core that is configured to form a passage of the magnetic flux and generate a magnetic force; a movable arrangement that is coupled to a movable core configured to be moved by the magnetic force and a needle configured to be driven by the movable core to open and close the injection hole, wherein a movable flow passage, which forms a part of the flow passage, is formed at an inside of the movable arrangement; and a valve main body that receives the movable arrangement in a movable state where the movable arrangement is movable along an axis of the fuel injection valve while the valve main body forms another part of the flow passage at an inside of the valve main body, wherein: the movable arrangement has a plurality of flow-restricting portions that include: a first flow-restricting portion that reduces a cross-sectional area of a portion of the movable flow passage; and a second flow-restricting portion that is spaced away from the first flow-restricting portion and reduces a cross-sectional area of another portion of the movable flow passage to a cross-sectional area that is equal to or larger than a cross-sectional area of the first flow-restricting portion; and a distance between the first flow-restricting portion and the second flow-restricting portion is larger than an equivalent diameter of the cross-sectional area of the second flow-restricting portion.

In the above aspect, the first flow-restricting portion may have a smallest opening cross-sectional area in the movable flow passage. According to this aspect, a portion of the movable flow passage, which has the smallest opening cross-sectional area, can be the first flow-restricting portion.

In the above aspect, the plurality of flow-restricting portions of the movable arrangement may further include a third flow-restricting portion that reduces a cross-sectional area of a further portion of the movable flow passage while a cross-sectional area of the third flow-restricting portion is equal to or larger than the cross-sectional area of the second flow-restricting portion. According to this aspect, a valve opening force, which is generated by a pressure wave applied to each of the flow-restricting portions, can be further dispersed relative to the time axis. Therefore, the valve opening of the needle by the pressure wave generated by the water-hammer action at the valve closing time can be limited.

In the above aspect, when viewed in an axial direction of the axis, in which the movable core is configured to move, each of the plurality of flow-restricting portions may be placed at a corresponding location, which overlaps with the axis, while a center of each of the plurality of flow-restricting portions is coaxial with the axis. According to this aspect, a radial size of the fuel injection valve can be reduced. Therefore, the fuel injection valve can be easily applied to an engine in which the fuel injection valve and the spark plug are arranged adjacent to each other.

In the above aspect, when viewed in an axial direction of the axis, in which the movable core is configured to move, at least one of the plurality of flow-restricting portions may have a center that is eccentric from the axis. With this aspect, a direction of the force applied to the at least one of the plurality of flow-restricting portions intersects a moving direction of the needle. Therefore, a force exerted in a valve-opening direction for inducing the valve opening of the needle is only a portion of the force applied to the at least one of the plurality of flow-restricting portions so that it is possible to make it more difficult to induce the valve-opening of the needle.

In the above aspect, the cross-sectional area of one of the plurality of flow-restricting portions, which is placed on an downstream side of another one of the plurality of flow-restricting portions in the movable flow passage, may be larger than the cross-sectional area of the another one of the plurality of flow-restricting portions, which is placed on an upstream side of the one of the plurality of flow-restricting portions in the movable flow passage. With this aspect, the magnitude of the valve-opening force applied to the one of the plurality of flow-restricting portions placed on the downstream side and the magnitude of the valve-opening force applied to the another one of the plurality of flow-restricting portions placed on the upstream side can be leveled. Thus, it is possible to make it more difficult to induce the valve-opening of the needle.

In the above aspect, at least one of the plurality of flow-restricting portions may be formed by a plurality of holes that are respectively placed at a plurality of positions arranged in a rotational symmetry about the axis. With this aspect, the needle can be made less likely to tilt when it receives the pressure wave.

In the above aspect, the plurality of flow-restricting portions may be respectively shaped in a form of a circular hole. The circular hole is easier to process than holes of other forms. Further, since the circular hole has a shorter peripheral length per cross-sectional area than the holes of other forms, it is not easily affected by the viscosity of the fuel flowing through the fuel injection valve.

According to another aspect, there is provided an engine system. The engine system includes: an engine; the fuel injection valve of any one of the above-described aspects that is configured to directly inject fuel in the engine; and a controller that is configured to drive the fuel injection valve to execute fuel injection twice or more per combustion cycle of the engine. When the fuel is injected from the second time onward, the fuel is injected at high pressure. Therefore, the water-hammer action at the valve-closing time is large. The present disclosure is effective in such a case.

In the above aspect, the engine system may include a plug that is configured to ignite the fuel, wherein the fuel injection valve and the plug may be arranged adjacent to each other; and the controller may be configured to execute the fuel injection from the fuel injection valve during a compression stroke of the engine.

The present disclosure can be realized in various forms. For example, in addition to the fuel injection valve, the present disclosure can be implemented as an engine system, a control method of the engine system, and the like.

What is claimed is:

1. A fuel injection valve including an injection hole for injecting fuel and a flow passage for conducting the fuel to the injection hole, the fuel injection valve comprising:

a coil that is configured to generate a magnetic flux when the coil is energized;

a stationary core that is configured to form a passage of the magnetic flux and generate a magnetic force;

a movable arrangement that is coupled to a movable core configured to be moved by the magnetic force and a needle configured to be driven by the movable core to open and close the injection hole, wherein a movable flow passage, which forms a part of the flow passage, is formed at an inside of the movable arrangement; and a valve main body that receives the movable arrangement in a movable state where the movable arrangement is movable along an axis of the fuel injection valve while the valve main body forms another part of the flow passage at an inside of the valve main body, wherein:

the movable arrangement has a plurality of flow-restricting portions that include:

a first flow-restricting portion that reduces a cross-sectional area of a portion of the movable flow passage; and a second flow-restricting portion that is spaced away from the first flow-restricting portion and reduces a cross-sectional area of another portion of the movable flow passage to a cross-sectional area that is equal to or larger than a cross-sectional area of the first flow-restricting portion; and a distance between the first flow-restricting portion and the second flow-restricting portion is larger than an equivalent diameter of the cross-sectional area of the second flow-restricting portion.

2. The fuel injection valve according to claim 1, wherein: the first flow-restricting portion has a smallest opening cross-sectional area in the movable flow passage.

3. The fuel injection valve according to claim 1, wherein: the plurality of flow-restricting portions of the movable arrangement further includes a third flow-restricting portion that reduces a cross-sectional area of a further portion of the movable flow passage while a cross-sectional area of the third flow-restricting portion is equal to or larger than the cross-sectional area of the second flow-restricting portion.

4. The fuel injection valve according to claim 1, wherein: when viewed in an axial direction of the axis, in which the movable core is configured to move, each of the plurality of flow-restricting portions is placed at a corresponding location, which overlaps with the axis, while a center of each of the plurality of flow-restricting portions is coaxial with the axis.

5. The fuel injection valve according to claim 1, wherein: when viewed in an axial direction of the axis, in which the movable core is configured to move, at least one of the plurality of flow-restricting portions has a center that is eccentric from the axis.

6. The fuel injection valve according to claim 1, wherein: the cross-sectional area of one of the plurality of flow-restricting portions, which is placed on an downstream side of another one of the plurality of flow-restricting portions in the movable flow passage, is larger than the cross-sectional area of the another one of the plurality of flow-restricting portions, which is placed on an upstream side of the one of the plurality of flow-restricting portions in the movable flow passage.

7. The fuel injection valve according to claim 1, wherein: at least one of the plurality of flow-restricting portions is formed by a plurality of holes that are respectively placed at a plurality of positions arranged in a rotational symmetry about the axis.

8. The fuel injection valve according to claim 1, wherein: the plurality of flow-restricting portions are respectively shaped in a form of a circular hole.

9. An engine system comprising:

an engine;

the fuel injection valve of claim 1 that is configured to directly inject fuel in the engine; and a controller that is configured to drive the fuel injection valve to execute fuel injection twice or more per combustion cycle of the engine.

10. The engine system according to claim 9, comprising a plug that is configured to ignite the fuel, wherein:

the fuel injection valve and the plug are arranged adjacent to each other; and the controller is configured to execute the fuel injection from the fuel injection valve during a compression stroke of the engine.

* * * * *